Figure 1:
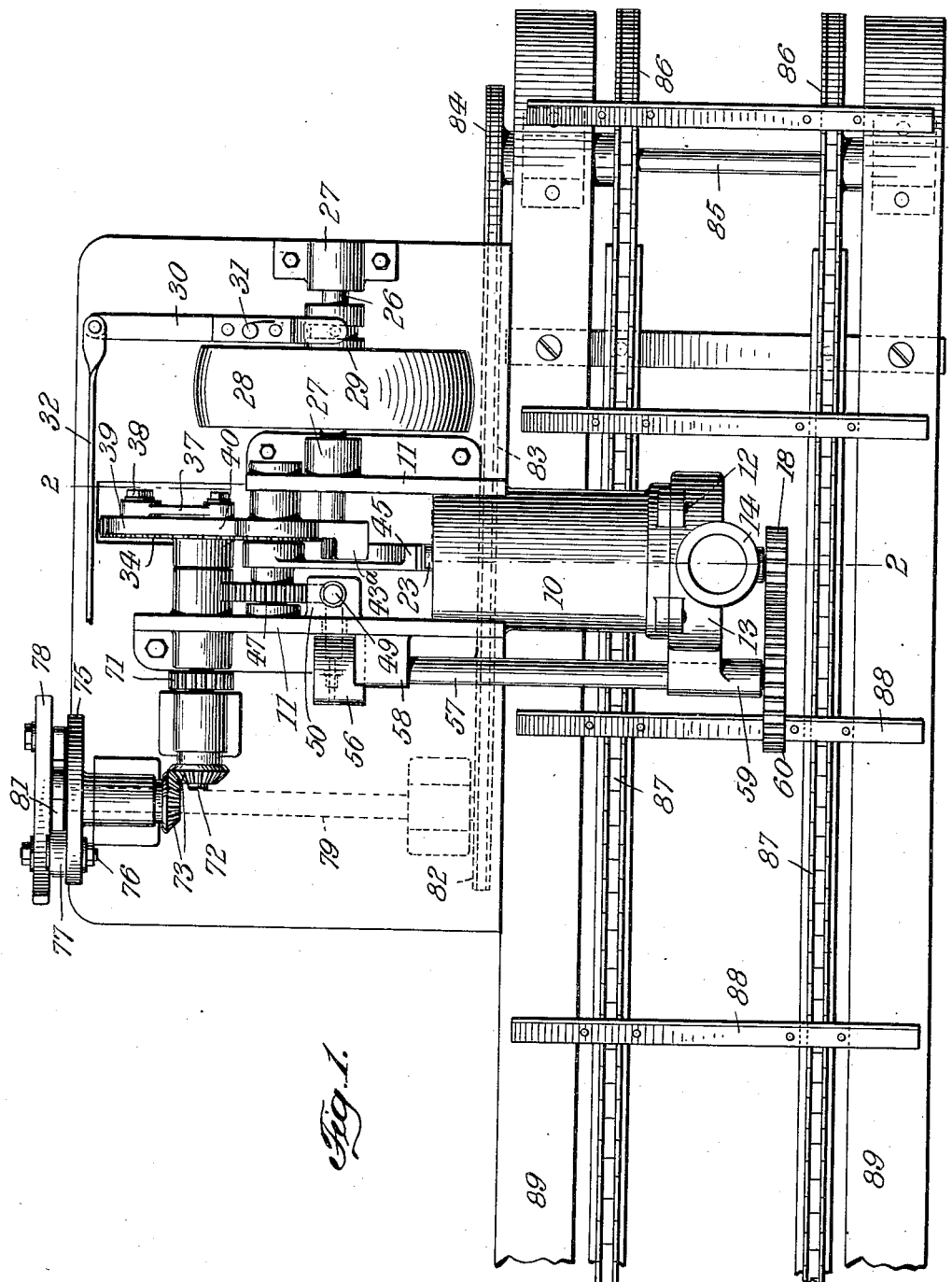

P. G. HOLLSTEIN.
MEASURING MACHINE FOR LIQUID CHOCOLATE AND SIMILAR ARTICLES.
APPLICATION FILED FEB. 19, 1913.

1,096,242.

Patented May 12, 1914.

3 SHEETS—SHEET 1.

Witnesses:
Inventor
Paul G. Hollstein
By his Attorneys

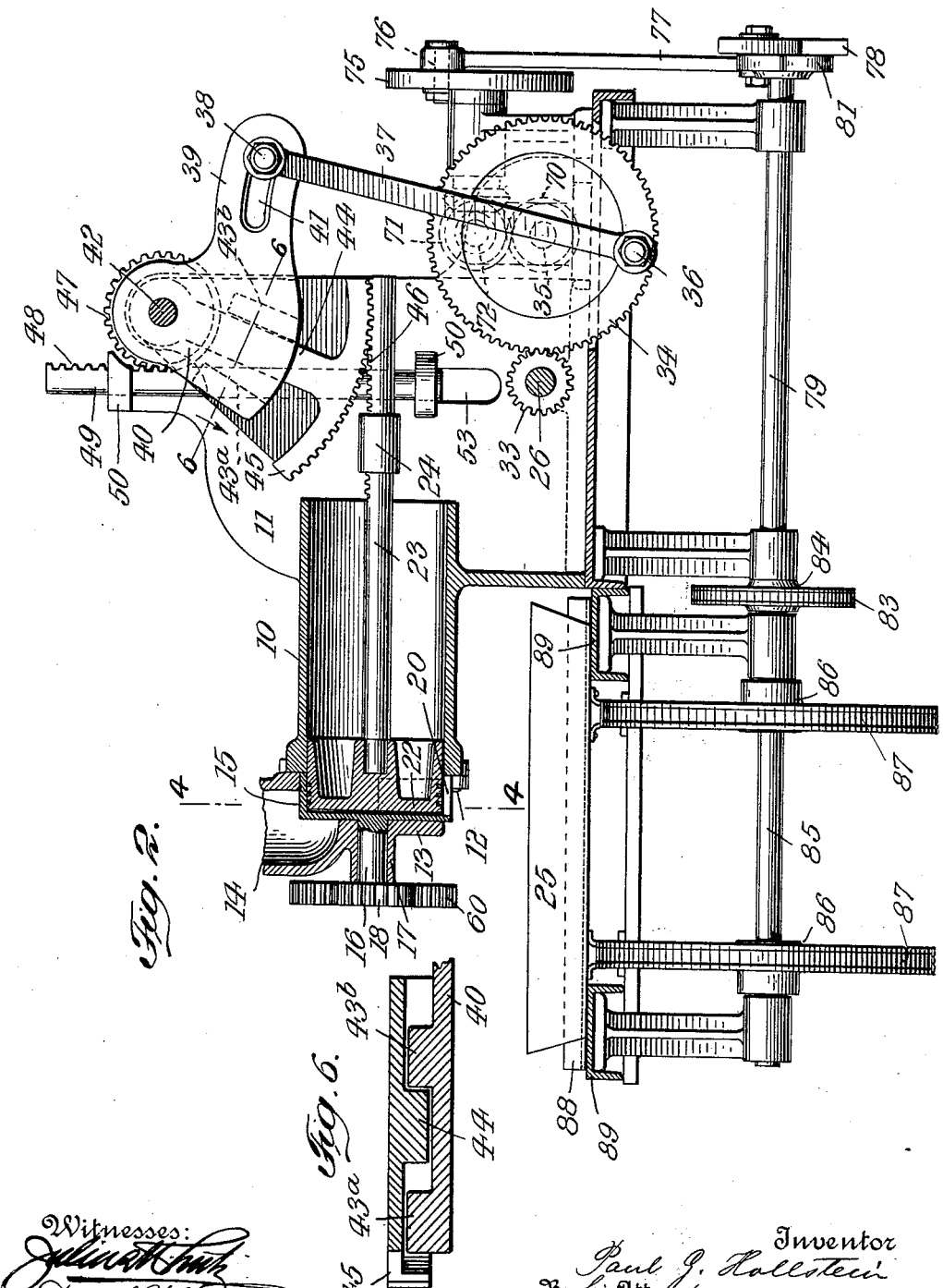

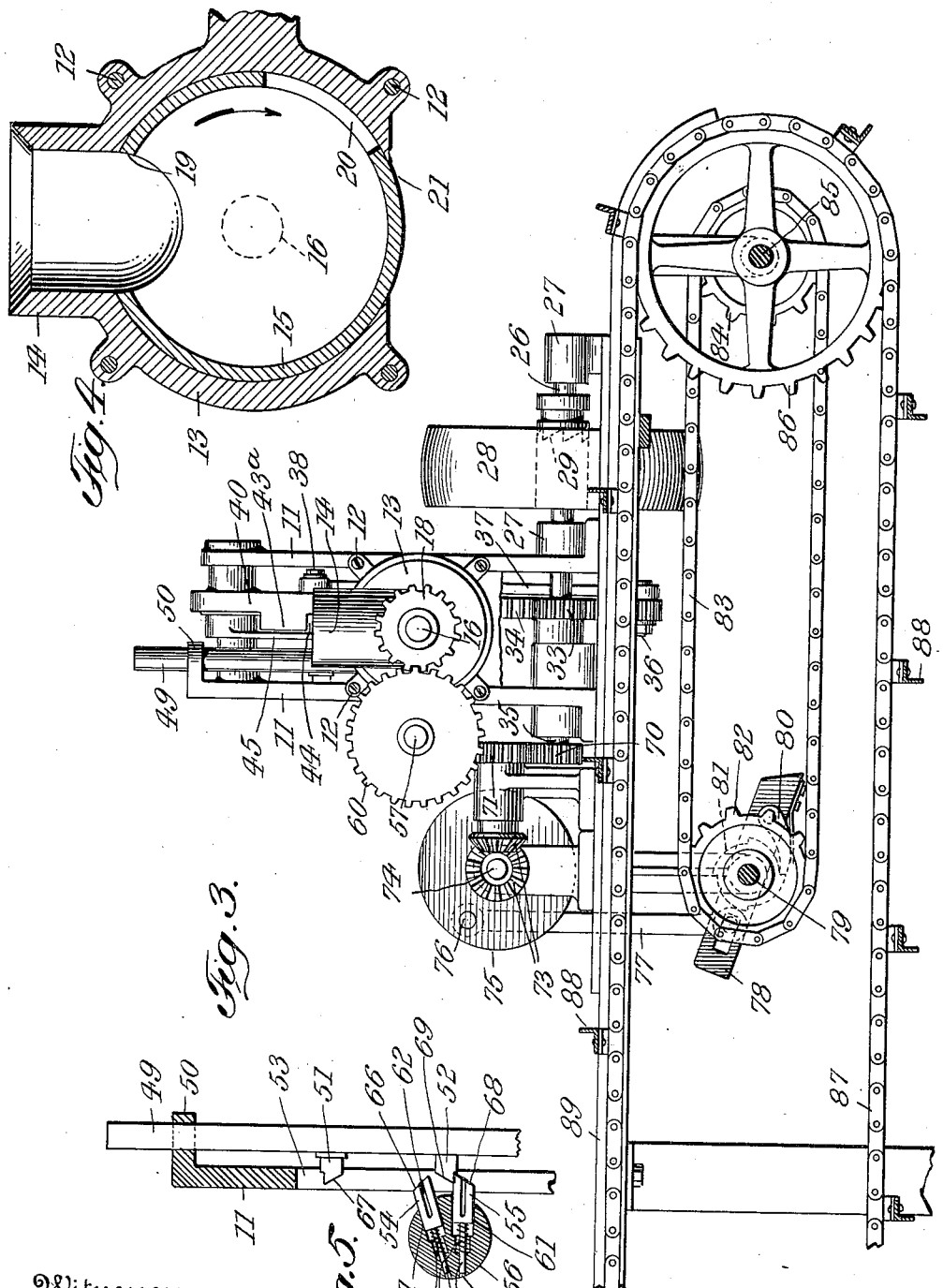

UNITED STATES PATENT OFFICE.

PAUL G. HOLLSTEIN, OF CARLSTADT, NEW JERSEY, ASSIGNOR TO J. M. LEHMANN COMPANY, OF NEW YORK, N. Y., A CORPORATION.

MEASURING-MACHINE FOR LIQUID CHOCOLATE AND SIMILAR ARTICLES.

1,096,242.  Specification of Letters Patent.  Patented May 12, 1914.

Application filed February 19, 1913. Serial No. 749,331.

*To all whom it may concern:*

Be it known that I, PAUL G. HOLLSTEIN, a citizen of Germany, residing at Carlstadt, county of Bergen, and State of New Jersey, have invented a new and Improved Measuring-Machine for Liquid Chocolate and Similar Articles, of which the following is a specification.

This invention relates to a novel machine for automatically measuring off predetermined quantities of liquid chocolate or similar articles and for subsequently discharging the bodies thus segregated into suitable molds which are intermittently fed past the discharge orifice of the measuring device proper.

The machine also comprises novel means for adjusting the same to different quantities of chocolate and other novel features more fully pointed out in the appended specification and claim.

In the accompanying drawing: Figure 1 is a plan view of a chocolate measuring machine embodying my invention; Fig. 2 a vertical section on line 2—2, Fig. 1; Fig. 3 a front elevation of the machine; Fig. 4 a cross section through the measuring cylinder on line 4—4, Fig. 2; Fig. 5 a detail of part of the valve-actuating mechanism, and Fig. 6 a cross section on line 6—6, Fig. 2.

My improved measuring machine comprises essentially a measuring vessel or cylinder 10 which is open at both ends. Cylinder 10 is supported by a pair of uprights 11 constituting part of the machine frame. To the front end of the cylinder is secured by screws 12 or otherwise, a head 13 provided with an upper inlet pipe 14 that communicates with a suitable continuous supply of liquid chocolate. Within a corresponding central recess of head 13, is mounted an oscillative cup-shaped valve 15, the inner wall of which extends flush with the bore of cylinder 10. Valve 15 is provided with a spindle 16 journaled within a bearing 17 of head 13 and carrying a relatively fixed gear wheel 18 that receives motion in manner hereinafter described. In order to establish temporary communication between cylinder 10 and supply pipe 14, valve 15 is provided with an upper inlet passage 19 which is adapted to register with said pipe (Fig. 4). In addition to this passage, valve 15 is provided with a lower outlet port 20 which is closed when passage 19 is situated opposite supply pipe 14. If valve 15 is turned in the direction of the arrow (Fig. 4) until port 20 registers with outlet 21, supply pipe 14 will be shut off from cylinder 10. Within cylinder 10 is mounted a piston 22 of convenient construction, the piston rod 23 of which is guided within a suitable bearing 24 of the machine frame.

The relative movements of valve 15 and piston 22 are so timed that upon the opening of passage 19, the piston 22 recedes to draw the desired amount of liquid chocolate into cylinder 10. After the latter has thus been charged, valve 15 is turned to close passage 19 and open port 20, whereupon the piston 22 is advanced to expel the chocolate into a suitable mold 25. Valve 15 is then returned to its original position, thus closing port 20 and opening passage 19, so that the play above described, may be repeated, while meanwhile the charged mold has been received from underneath outlet 21 and an empty mold has been placed in position. For effecting these various movements, the following construction has been devised: Upon a power shaft 26 mounted in bearings 27 of the machine frame is loosely mounted a driving pulley 28 which may be coupled to said shaft by means of a clutch 29. The movable member of the latter is by a two arm lever 30 pivoted at 31, to a shipping bar 32 which may be operated in any suitable manner. Upon shaft 26 is mounted a pinion 33 meshing into a gear wheel 34 of a counter shaft 35. Wheel 34 is provided with a wrist pin 36 engaged by the lower end of a link 37, the upper end of which is by screw bolt 38 pivotally connected to the rearwardly projecting arm 39 of a disk 40, bolt 38 engaging a slot 41 of said arm, so that the play of disk 40 may be regulated at will. Disk 40 is non-rotatably mounted upon a rock shaft 42 supported by uprights 11 and carries a pair of laterally extending lugs 43ᵃ and 43ᵇ. The latter straddle a central rib 44 of a toothed sector 45 that turns loosely on shaft 42, the distance between lugs 43ᵃ, 43ᵇ exceeding the thickness of rib 44. Sector 45 engages corresponding teeth 46 formed on the piston rod 23, so that a rotation of shaft 35 will cause an oscillation of disk 40, which movement will in turn be transformed into an intermittent reciprocative movement of piston 22 owing to the play between lugs 43ᵃ, 43ᵇ and rib 44. During the temporary rests of piston 22 thus obtained, valve 15 is operated in the following manner: To shaft 42 is keyed or otherwise attached, a pinion 47 that engages a rack 48 formed on a vertically reciprocative plunger 49. The latter is guided in corresponding eyes 50 formed on one of the standards 11 and carries a pair of tappets 51, 52 that are accommodated within a corresponding vertical slot 53 of said standard. In alinement with tappets 51, 52, there are arranged a pair of abutments 54, 55 that are yieldingly mounted in the head 56 of a shaft 57. The latter extends parallel to the axis of cylinder 10 and is rotatably mounted in bearings 58, 59 of one of the standards 11 and cylinder head 13 respectively. At its front end, shaft 57 carries a gear wheel 60 that meshes into gear wheel 18 of valve spindle 16.

As illustrated in Fig. 5, the abutments 54, 55 are guided in diverging cylindrical sockets 61 of head 56, any rotation of the abutments being prevented by suitable pin and groove connections, of which grooves 62 only are shown in the drawings. The abutments are provided with rearwardly extending stems 63, guided in corresponding bores 64 of head 56 and encircled by springs 65 that tend to force the abutments outward. Abutment 54 is provided with an upper bevel 66 adapted to be engaged by a lower bevel 67 of tappet 51, while abutment 55 is provided with a lower bevel 68 adapted to be engaged by an upper bevel 69 of tappet 52 as illustrated in Fig. 5.

The several parts illustrated in Figs. 2 and 5 occupy the position at the forward stroke of piston 22, during which operation inlet passage 19 was closed while outlet port 20 was open, so as to permit the discharge of the liquid chocolate previously contained within cylinder 10 into mold 25, in which position, link 37 occupies the dead center (Fig. 2). Upon the continued rotation of gear wheel 34, disk 40 will be partly rotated without transmitting motion to piston 22 until the lug 43ª will abut against rib 44 to cause a movement of said piston to the right. During the idle rotation of disk 40, hereabove referred to, plunger 49 is lowered owing to the engagement of gear wheel 42 with teeth 48 of said plunger. By the descent of plunger 49, tappet 52 in bearing against abutment 55, will rotate head 56 and shaft 57 until said tappet slips off abutment 55. During the continued descent of plunger 49, the beveled face 67 of tappet 51 will engage the corresponding face of abutment 54, so that the latter will be forced inward against the action of its spring 65, without imparting any rotary movement to shaft 57. As soon as tappet 51 has cleared abutment 54, the latter will be moved outward by spring 66, the movements being so timed, that immediately upon the release of abutment 54, the downward movement of plunger 49 is completed. The above described partial rotation of shaft 57 is, by gear wheels 60, 18 transmitted to valve 15, whereby the latter is rotated to such an extent as to open passage 19 and close port 20. Simultaneous with the completion of the valve movement, an engagement between lug 43ª and rib 44 takes place, so that during the continued rotation of shaft 35, piston 22 will be withdrawn from head 13 to suck into cylinder 10 from pipe 14 the desired quantity of liquid chocolate. After link 37 has passed the dead center, disk 40 will first be rotated without imparting movement to sector 45 owing to the fact that lug 43ᵇ is now spaced from rib 44. During this movement of disk 40 and gear wheel 47, plunger 49 will ascend, so that tappet 51, which is now located beneath abutment 54 as above explained, will take along abutment 54 to swing shaft 57 back into its original position, when said tappet will slip off abutment 54, the parts occupying at the end of the upstroke of plunger 49, the position illustrated in Fig. 5. During this return movement of shaft 57, valve 15 will be turned in the direction of the arrow (Fig. 4) until inlet passage 19 has been closed and port 20 brought into alinement with outlet 21. Immediately upon the completion of this valve movement, lug 43ᵇ will engage rib 44 of sector 45 thus causing an advance of piston 22 to expel the chocolate charge of cylinder 10 into the mold 25, whereupon the operation described is repeated.

For successively feeding a plurality of molds under outlet 21 synchronously with the valve and piston movements, the following construction has been devised: Upon shaft 35 is mounted a gear wheel 70 which transmits motion through gear wheel 71, shaft 72, and miter wheels 73 to a shaft 74. The latter carries a disk 75, a wrist pin 76 of which is by link 77 adjustably connected to an oscillating arm 78 loosely mounted on a transverse shaft 79. Arm 78 carries a spring-influenced pawl 80 engaging a ratchet wheel 81 fast on shaft 79. To the latter is firmly attached a chain wheel 82 which transmits motion by a chain 83 to a chain wheel 84 mounted on a shaft 85. This shaft carries a pair of additional chain wheels 86 engaged by chains 87 which are connected by spaced feed bars 88. Exteriorly to chains 87, a pair of guide rails 89 are provided upon which the molds are placed. The various transmissions described are so timed that during the charging operation of cylinder 10, pawl 80 will advance ratchet wheel 81 to such an extent that the previously charged mold is removed from underneath opening 21 and an empty mold is fed underneath said opening. It will be seen that the quantity of liquid chocolate intermittently discharged into molds 25 depends upon the stroke-length of piston 22. By regulating the position of screw bolt 38 within the slot 41 of disk 40, the length of the piston stroke may be correspondingly regulated so as to set the machine to the discharge of any desired segregated quantities of chocolate.

I claim:

In a measuring machine of the character described, a fixed open-ended measuring cylinder, a recessed head rigidly attached to one end of said cylinder and having a liquid inlet opening and a liquid outlet opening, a cup-shaped valve rotatably mounted within the head-recess and provided with a pair of passages that are adapted to alternately register with said inlet and outlet openings, the inner cylindrical wall of said valve extending flush with the inner cylinder-wall, means for intermittently oscillating the valve, a piston slidably mounted within the cylinder and adapted to enter the valve, and means for intermittently reciprocating the piston.

PAUL G. HOLLSTEIN.

Witnesses:
ARTHUR E. ZUMPE,
KATHERYNE KOCH.